United States Patent [19]
Tanibata

[11] Patent Number: 5,390,000
[45] Date of Patent: Feb. 14, 1995

[54] EXPOSURE APPARATUS INCLUDING PLZT OPTICAL SHUTTER

[75] Inventor: Tohru Tanibata, Wakayama, Japan

[73] Assignee: Noritsu Koki Co., Ltd., Wakayama, Japan

[21] Appl. No.: 59,958

[22] Filed: May 13, 1993

[51] Int. Cl.$^6$ ............................................. G03B 27/72
[52] U.S. Cl. ............................................................ 355/71
[58] Field of Search .................... 355/228, 27, 67, 68, 355/69, 70, 71, 202

[56] References Cited

U.S. PATENT DOCUMENTS

| | | | |
|---|---|---|---|
| 3,926,520 | 12/1975 | Kaufman | 355/71 X |
| 4,025,189 | 5/1977 | Pugsley | 355/71 X |
| 4,229,095 | 10/1980 | Mir | 355/35 X |
| 4,639,127 | 1/1987 | Beery et al. | 355/35 |
| 4,937,592 | 6/1990 | Akao et al. | 355/202 X |
| 5,122,831 | 6/1992 | Suzuki | 355/37 |

Primary Examiner—Fred L. Braun
Attorney, Agent, or Firm—Wenderoth, Lind & Ponack

[57] ABSTRACT

An improved exposure apparatus is capable of providing 100% of a light shielding affect when closing a PLZT optical shutter even if a light source remains turned on and thus produces a high-speed, high-quality exposures. For that purpose, the exposure apparatus includes a light source; a PLZT optical shutter of linear form extending at a right angle to a the pass line of a photosensitive material for exposing the photosensitive material during its running; a light modulation filter unit having a plurality of optical modulation filters arranged in a row along a light path of the light source; a light modulation filter driving mechanism for actuating the optical modulation filters separately to advance them to and retract them from a light path between the PLZT optical shutter and the light source, and a filter driving mechanism controller for controlling the movement of the light modulation filter driving mechanism so that a desired tone of light can be obtained at a predetermined timing.

2 Claims, 1 Drawing Sheet

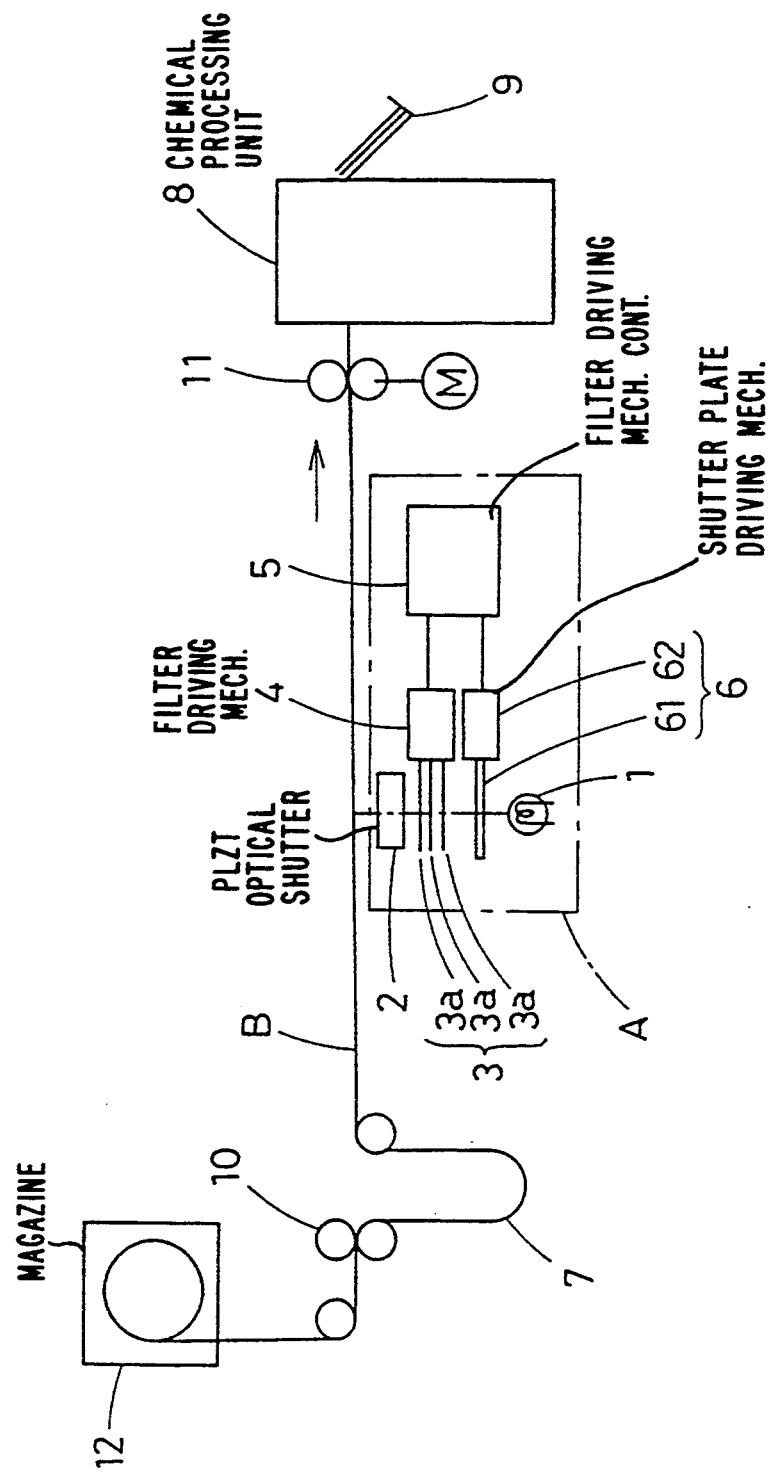

5,390,000

EXPOSURE APPARATUS INCLUDING PLZT OPTICAL SHUTTER

BACKGROUND OF THE INVENTION

The present invention relates to an exposure apparatus.

A PLZT electro-optical device is known to produce an electro-optical effect of varying its double refracting characteristics in accord with an applied voltage and thus, is used as an optical shutter. Conventional exposure apparatuses employ such PLZT optical shutters for controlling an exposure through optical modulation with the application of different voltages.

However, the disadvantage of such conventional exposure apparatuses is that although line exposure is feasible during movement of a photosensitive material, the PLZT optical shutter when closed cannot perfectly prevent the passing of light to the photosensitive material which remains stationary. Particularly when a light source remains turned on, a leak of light from the PLZT optical shutter reaches the photosensitive material causing unwanted exposure. Also, the conventional exposure apparatuses offer only monotone exposure.

SUMMARY OF THE INVENTION

It is an object of the present invention, in view of the above, to provide an improved exposure apparatus capable of providing 100% of a light shielding effect when closing of the PLZT optical shutter even if a light source remains turned on and thus producing a high-speed, high-quality exposure operation.

An exposure apparatus according to the present invention, comprises: a light source; a PLZT optical shutter of linear form extending at a right angle to a pass line of a photosensitive material for exposing the photosensitive material during its running; a light modulation filter unit having a plurality of optical modulation filters arranged in a row along a light path of the light source; a light modulation filter driving mechanism for actuating the optical modulation filters separately to advance them to and retract them from a light path between the PLZT optical shutter and the light source, and a filter driving mechanism controller for controlling the movement of the light modulation filter driving mechanism so that a desired tone of light can be obtained at a predetermined timing.

Also, an exposure apparatus according to the present invention may from the exposure apparatus described above differ by the fact that a mechanical shutter is also mounted across the light path between the PLZT optical shutter and the light source for mechanically stopping or allowing the passage the light.

The exposure apparatus of according to the present invention has a combination of the PLZT optical filter, the light modulation filter unit with a plurality of the optical modulation filters arranged along the light path, and the optical modulation filter driving mechanism for moving the light modulation filters separately to and from the light path between the PLZT optical shutter and the light source so that the intrusion of light when the closing of the PLZT optical shutter can be minimized with the use of all the optical modulation filters across the light path.

The filter driving mechanism can be actuated at predetermined timings to produce a desired intensity of light thus ensuring exposure to a wanted tone.

The exposure apparatus of the present invention having the mechanical shutter allows the mechanical shutter, which is arranged across the light path between the PLZT optical shutter and the light source, to stop the passage of light completely when closed down. As the result, the action of the PLZT optical shutter for cutting off the light can be complemented, thus ensuring a high-speed, high-quality exposure operation.

It is common to take a considerable length of time before the light source returns back to a stable intensity after the light source has been turned off and then on. This time loss prevents a high-speed exposure. The exposure to an insufficient amount of light before the light intensity becomes stable will produce lower quality prints. Each exposure apparatus according to the present invention is however capable of performing a high-speed, high-quality exposure actions operation since the light source does not have to be turned off.

DESCRIPTION OF THE DRAWINGS

FIG. 1 is a schematic view of an image printer provided with an exposure apparatus of the present invention.

DETAILED DESCRIPTION OF THE PREFERRED EMBODIMENT

A preferred embodiment of the present invention will be described in the form of an exposure apparatus referring to FIG. 1.

The exposure apparatus A comprises a light source 1, a PLZT optical shutter 2, and a light modulation filter unit 3 arranged across the light path between the light source 1 and the PLZT optical shutter 2 for filter action. The light modulation filter unit 3 contains a row of optical modulation filters 3a which are arranged along the light path from the light source 1 for movement separately in and from the light path.

Each optical modulation filter 3a of the light modulation filter unit 3 can be independently advanced to and retracted from the light path between the light source 1 and the PLZT optical shutter 2 by a light modulation filter driving mechanism 4.

The light modulation filter driving mechanism 4 is controlled by a filter driving mechanism controller 5 for producing a desired tone of light at predetermined timings.

The PLZT optical shutter 2 has a layer form comprising a polarizer disposed at the light entrance side, a PLZT crystal, and an analyzer disposed at the light exist side. The PLZT crystal is sandwiched between two opposite electrodes so that its double-refraction characteristic can be varied by varying voltage between the electrodes for optical control.

Also, element by 6 is a mechanical shutter which comprises a shutter plate 61 and a shutter plate driving mechanism 62. The mechanical shutter 6 is disposed across the light path between the light source 1 and the PLZT optical shutter 2, the light path extending from the light source 1 to a photosensitive material B. Its shutter plate 61 can be advanced and retracted at a right angle to the light path to perform mechanical opening and closing operations. The opening and closing operations of the shutter plate 61 can also be controlled by the filter driving mechanism controller 5.

FIG. 1 shows an arrangement of an image printer provided with the exposure apparatus B of the present invention. The arrangement contains a magazine 12 in which the photosensitive material B is installed in a roll, a loop station 7, a chemical processing unit 8, a collector tray 9 in which the photosensitive material B processed by the chemical processing unit 8 and separated to frames is recovered in a series of prints, and two transfer roller units 10 and 11.

Also, an advance motor M is mounted for driving the transfer roller unit 11. The action of the advance motor M is linked with the opening and closing of the PLZT optical shutter 2, the opening and closing of the mechanical shutter 6, and the action of the light modulation filter unit 3 so that the photosensitive material B is exposed to a desired image under optimum conditions.

The overall operation of the image printer containing the exposure apparatus of the present invention will be explained in a sequence.

1. The photosensitive material B is unloaded from the magazine 12 by the action of the transfer roller unit 10.

2. The photosensitive material B is then fed into the loop station 7 where it runs through a loop.

3. While being driven along a transfer line by the advance motor M, the photosensitive material B is exposed at the exposure apparatus. The PLZT optical shutter 2 controls the intensity of light for linear exposure action while the photosensitive material B runs at a constant speed.

More particularly, the intensity of light is controlled by a discrete timing action of the light modulation filter unit 3 for exposure to a desired tone of optical image.

4. The photosensitive material B exposed at the exposure apparatus is processed in the chemical processing unit 8.

In an exposure apparatus with absence of the mechanical shutter 6, the intrusion of light through the PLZT optical shutter 2 in its closed state while the photosensitive material B standing still can be attenuated to a minimum by setting all the optical modulation filters 3a of the light modulation filter unit 3 across the light path.

What is claimed is:

1. An exposure apparatus comprising:
  a light source;
  a PLZT optical shutter of linear form extending at a right angle to a pass line of a photosensitive material for exposing the photosensitive material during its running;
  a light modulation filter unit having a plurality of optical modulation filters arranged in a row along a light path of the light source;
  a light modulation filter driving mechanism for individually actuating the optical modulation filters separately to selectively advance them to and retract them from a light path between the PLZT optical shutter and the light source, said driving mechanism advancing and retracting from one to all of said plurality of optical modulation filters from said light path; and
  a filter driving mechanism controller for controlling the movement of the light modulation filter driving mechanism so that a desired tone of light can be obtained at a predetermined timing.

2. An exposure apparatus comprising:
  a light source;
  a PLZT optical shutter of linear form extending at a right angle to a pass line of a photosensitive material for exposing the photosensitive material during its running;
  a light modulation filter unit having a plurality of optical modulation filters arranged in a row along a light path of the light source;
  a light modulation filter driving mechanism for actuating the optical modulation filters separately to advance them to and retract them from a light path between the PLZT optical shutter and the light source;
  a filter driving mechanism controller for controlling the movement of the light modulation filter driving mechanism so that a desired tone of light can be obtained at a predetermined timing; and
  a mechanical shutter disposed across the light path between the PLZT optical shutter and the light source for mechanically stopping or allowing the passage of light through the light path.

* * * * *